US010789543B1

(12) United States Patent
Sun

(10) Patent No.: US 10,789,543 B1
(45) Date of Patent: Sep. 29, 2020

(54) FUNCTIONAL OBJECT-ORIENTED NETWORKS FOR MANIPULATION LEARNING

(71) Applicant: Yu Sun, Tampa, FL (US)

(72) Inventor: Yu Sun, Tampa, FL (US)

(73) Assignee: University of South Florida, Tampa, FL (US)

( * ) Notice: Subject to any disclaimer, the term of this patent is extended or adjusted under 35 U.S.C. 154(b) by 1311 days.

(21) Appl. No.: 14/922,531

(22) Filed: Oct. 26, 2015

Related U.S. Application Data

(60) Provisional application No. 62/068,153, filed on Oct. 24, 2014.

(51) Int. Cl.
*G06N 5/02* (2006.01)
*G06N 20/00* (2019.01)
*G06N 7/00* (2006.01)
*B25J 9/16* (2006.01)

(52) U.S. Cl.
CPC .............. *G06N 20/00* (2019.01); *B25J 9/163* (2013.01); *G06N 5/02* (2013.01); *G06N 7/005* (2013.01); *Y10S 901/50* (2013.01)

(58) Field of Classification Search
None
See application file for complete search history.

(56) References Cited

U.S. PATENT DOCUMENTS

| | | | | |
|---|---|---|---|---|
| 6,122,752 A * | 9/2000 | Farah | ................... | G06F 11/2263 714/2 |
| 6,363,494 B1 * | 3/2002 | Farah | ................... | G06F 11/2263 710/29 |
| 9,566,710 B2 * | 2/2017 | Passot | ...................... | B25J 9/163 |
| 9,672,756 B2 * | 6/2017 | Gupta | ................. | G09B 19/0053 |
| 9,925,662 B1 * | 3/2018 | Jules | ..................... | G05B 19/423 |
| 2009/0132088 A1 * | 5/2009 | Taitler | .................... | G05B 19/42 700/264 |
| 2013/0245824 A1 * | 9/2013 | Barajas | .................. | B25J 9/1664 700/253 |

(Continued)

FOREIGN PATENT DOCUMENTS

EP    1086733 A1    3/2001

OTHER PUBLICATIONS

Argail et al., "A Survey of Robot Learning from Demonstration", May 2009, Robotics and Autonomous Systems, pp. 1-15 (Year: 2009).*

(Continued)

*Primary Examiner* — Paulinho E Smith
(74) *Attorney, Agent, or Firm* — Thomas | Horstemeyer, LLP

(57) ABSTRACT

In some embodiments, a functional object-oriented network (FOON) is provided that includes a plurality of functional units each comprising two or more input object nodes that each identify an object and its state before a manipulation motion is performed, a motion node that identifies a manipulation motion that can be performed using the objects, and one or more output object nodes that each identify an object and its state after the manipulation motion has been performed using the objects. In some embodiment, a robot can used the FOON to determine the discrete actions that are required to perform a given task.

10 Claims, 12 Drawing Sheets

(56) References Cited

U.S. PATENT DOCUMENTS

| | | | | |
|---|---|---|---|---|
| 2014/0249671 | A1* | 9/2014 | Halloran | A47L 5/30 |
| | | | | 700/245 |
| 2016/0059407 | A1* | 3/2016 | Sonoda | B25J 9/0081 |
| | | | | 700/260 |
| 2016/0059412 | A1* | 3/2016 | Oleynik | B25J 9/163 |
| | | | | 700/257 |
| 2016/0260027 | A1* | 9/2016 | Kuwabara | B25J 13/08 |
| 2018/0147718 | A1* | 5/2018 | Oleynik | G05B 19/42 |

OTHER PUBLICATIONS

Dillmann, Rudiger, "Teaching and learning of robot tasks via observation of human performance", Robotics and Autonomous Systems, Elsevier, Science Direct, 47, pp. 109-116, 2004.

* cited by examiner

|          | cd   | pencil | teapot | bottlecap | spoon |
|----------|------|--------|--------|-----------|-------|
| cd       | 0.79 | 0.18   | 0.03   | 0         | 0     |
| pencil   | 0    | 0.44   | 0      | 0.02      | 0.54  |
| teapot   | 0.01 | 0.13   | 0.85   | 0         | 0.01  |
| bottlecap| 0.01 | 0.14   | 0.01   | 0.84      | 0     |
| spoon    | 0    | 0.18   | 0      | 0.01      | 0.8   |

FIG. 6A

|          | cd   | pencil | teapot | bottlecap | spoon |
|----------|------|--------|--------|-----------|-------|
| cd       | 0.91 | 0.09   | 0.01   | 0         | 0     |
| pencil   | 0.04 | 0.69   | 0      | 0.01      | 0.26  |
| teapot   | 0    | 0.06   | 0.94   | 0         | 0     |
| bottlecap| 0    | 0.03   | 0      | 0.97      | 0     |
| spoon    | 0    | 0.18   | 0.01   | 0.01      | 0.8   |

FIG. 6B

|          | put cd | put pencil | pour | screw | stir |
|----------|--------|------------|------|-------|------|
| put cd   | 0.46   | 0.19       | 0.17 | 0.09  | 0.06 |
| put pencil | 0.12 | 0.35       | 0.21 | 0.02  | 0.3  |
| pour     | 0.11   | 0.26       | 0.34 | 0.08  | 0.21 |
| screw    | 0.17   | 0.1        | 0.13 | 0.57  | 0.03 |
| stir     | 0.08   | 0.22       | 0.25 | 0.07  | 0.39 |

FIG. 7A

|          | put cd | put pencil | pour | screw | stir |
|----------|--------|------------|------|-------|------|
| put cd   | 0.82   | 0.07       | 0.06 | 0.03  | 0.02 |
| put pencil | 0.02 | 0.6        | 0.09 | 0.01  | 0.28 |
| pour     | 0.01   | 0.02       | 0.95 | 0.01  | 0.02 |
| screw    | 0.02   | 0.01       | 0.01 | 0.96  | 0    |
| stir     | 0.03   | 0.07       | 0.06 | 0.02  | 0.82 |

FIG. 7B

FUNCTIONAL OBJECT-ORIENTED NETWORKS FOR MANIPULATION LEARNING

CROSS-REFERENCE TO RELATED APPLICATION

This application claims priority to U.S. Provisional Application Ser. No. 62/068,153, filed Oct. 24, 2014, which is hereby incorporated by reference herein in its entirety.

BACKGROUND

The manipulation motion of an object is better defined when one knows the other object with which this object will interact. For example, humans have the manipulation skills to move a teapot in many different ways, such as placing it on a table, storing it on a shelf, or washing it. However, if a person has a teapot and a teacup in front of him or her, the manipulation skill that the person most likely wants to apply is a liquid pouring motion. Therefore, a teapot is associated with a teacup with a pouring motion and the two objects share a functional relationship. At the same time, a teapot is associated to many other objects with other manipulation skills and therefore shares other functional relationships with the other objects.

If robots could learn such functional relationships between objects, the robots could associate them with manipulation skills. In such cases, a robot could, for example, be taught what manipulations to perform when presented with certain objects or what manipulations to perform on given objects to obtain a particular result, such as a filled teacup. It would therefore be desirable to have a system and method for teaching such functional relationships to robots.

BRIEF DESCRIPTION OF THE DRAWINGS

The present disclosure may be better understood with reference to the following figures. Matching reference numerals designate corresponding parts throughout the figures, which are not necessarily drawn to scale.

FIGS. 6A and 6B are likelihood confusion matrices of manipulated objects for (A) a result using an HoG detector and (B) a result using a Bayesian network.

FIGS. 7A and 7B are action likelihood confusion matrices for (A) a result using only motion features and (B) a result using framework.

DETAILED DESCRIPTION

Figure 1A:
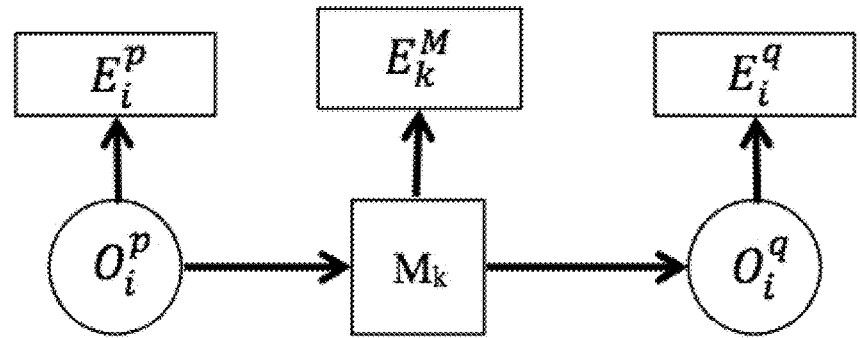
FIG. 1A is a graphical model illustrating single object manipulation.

As described above, it would be desirable to have a system and method for teaching robots the functional relationships between objects to assist the robots in determining what manipulations to perform on the objects to complete a desired task. Disclosed herein are examples of such systems and methods. As described below, functional-related objects and their relative motions (functional motions) can be connected during object manipulations to form a graphical model functional object-oriented network (FOON). The FOON can be created by a robot or other computer-based system by observing object state changes and human manipulations of the objects. Alternatively, the FOON can be created by human operators by annotating video of tasks being performed. Once created, the FOON can provide robots with the ability to understand a task in the format of object states and object-related functional motions and generate motions based on the learning motions to manipulate the objects properly for a desired task.

In the following disclosure, various specific embodiments are described. It is to be understood that those embodiments are example implementations of the disclosed inventions and that alternative embodiments are possible. All such embodiments are intended to fall within the scope of this disclosure.

Studies in neuroscience and cognitive science on object affordance indicate that the mirror neurons in human brains congregate visual and motor responses. Mirror neurons in the F5 sector of the macaque ventral premotor cortex fire during both observation of interacting with an object and action execution, but do not discharge in response to simply observing an object. Recently, the affordances associated to pairs of objects positioned for action were studied and an interesting so-called "paired object affordance effect" was found. The effect was that the response time by right-handed participants was faster if the two objects were used together when the active object (supposed to be manipulated) was to the right of the other object.

The functional relationship between paired objects has also been studied compared with the spatial relationship between the objects. It was found that both the position and functional context are important and related to the motion; however, the motor action response was faster and more accurate with the functional context than the spatial context. These results indicate that there are strong connections between the observation of objects and the functional motions, and functional relationships between objects are directly associated with the motor actions.

This interesting phenomenon can be observed in human daily life. When humans perform tasks, they pay attention not only to objects and their states but also to object interactions caused by manipulation. The manipulation reflecting the motor response is tightly associated with both the manipulated object and the interacted object. For example, when writing on paper with a pen, humans carry out their writing motor action based on both the pen and the paper and pay attention on the pen point, which is the interaction point between the pen and the paper. Moreover, object interactive motion can directly reveal an object's functions. For instance, when a book is placed into a schoolbag, the placing motion tells the observer that the schoolbag is a container for books.

In previous work by the inventor, object categorization and action recognition using an object-object-interaction affordance framework were investigated. The details of the investigation are described in "Human-Object-Object-Interaction Affordance," Workshop on Robot Vision, 2013, by Shaongang Ren and Yu Sun, which is hereby incorporated by reference into the present disclosure. Through that work, an approach was developed to capitalize on the strong relationship between paired objects and interactive motion by building an object relation model and associating it with a human action model in the human-object-object way to characterize inter-object affordance, and thus use the inter-object affordance relationship to improve object and action recognition.

Similar to the mirror neurons in human brains that congregate the visual and motor responses, a methodology can be used to congregate the object recognition and manipulation motion in an intelligent robot in a powerful and elegant FOON that connects interactive objects with their functional motions.

As can be appreciated from the above discussion, motion should naturally involve one or several objects and their states can be changed by the manipulating motion. For cases in which only one object state is changed, a simple hidden Markov model (HMM) can be used to model the state change of the object. For example, a box may be "open" or "closed" as its state, and the "close" or "open" manipulation motion can change the box's state. To include the functional motion of the object, the simple HMM can be modified to a more general graphical model illustrated in FIG. 1A in which the nodes of the object states and the functional motions can be connected. In general, a single object i at its state $O_i^p$ changes to $O_i^q$ by a functional object motion $M_k$. The object states can be observed through $E_i^p$ and $E_i^q$, and the functional motion can be observed through $E_k^M$.

Figure 2A:
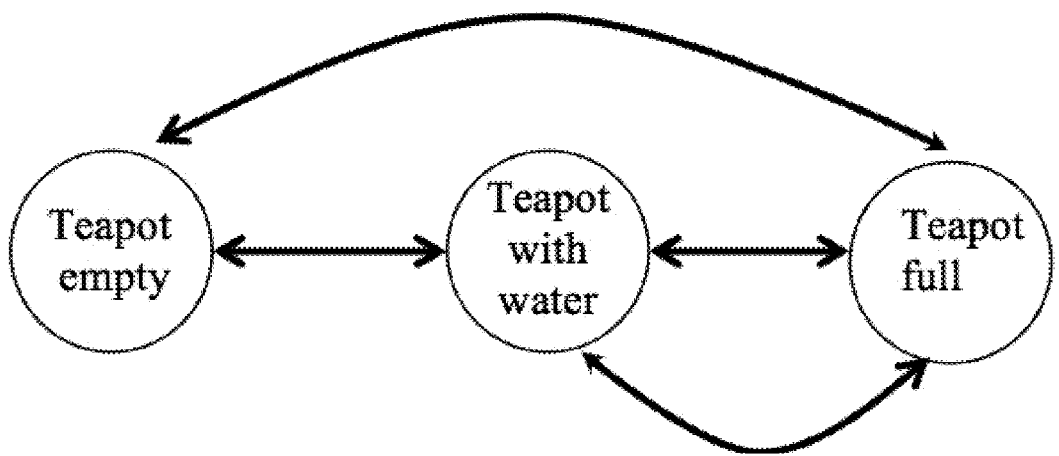
FIG. 2A is a graphical model illustrating the states of a teapot modeled with a state machine.
Figure 2B:
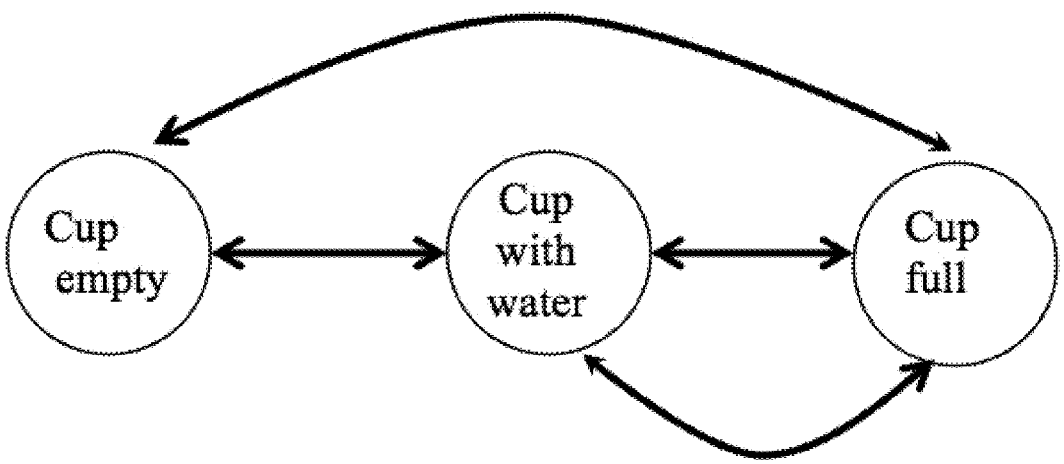
FIG. 2B is a graphical model illustrating the states of a cup modeled with a state machine.

In other tasks, one object is manipulated and interacted with a second object. For example, a teapot may have three different states for holding the teapot, as illustrated in FIG. 2A, to pour water into a cup, which also has three different states (FIG. 2B). After the pouring manipulation motion, both states of the objects, the teapot and the cup, have changed. Two HMMs can be structured to model the state change of the two objects separately. However, if only the two HMMs are used, the cause of the state change and the connection of the two objects are neglected.

Figure 1B:
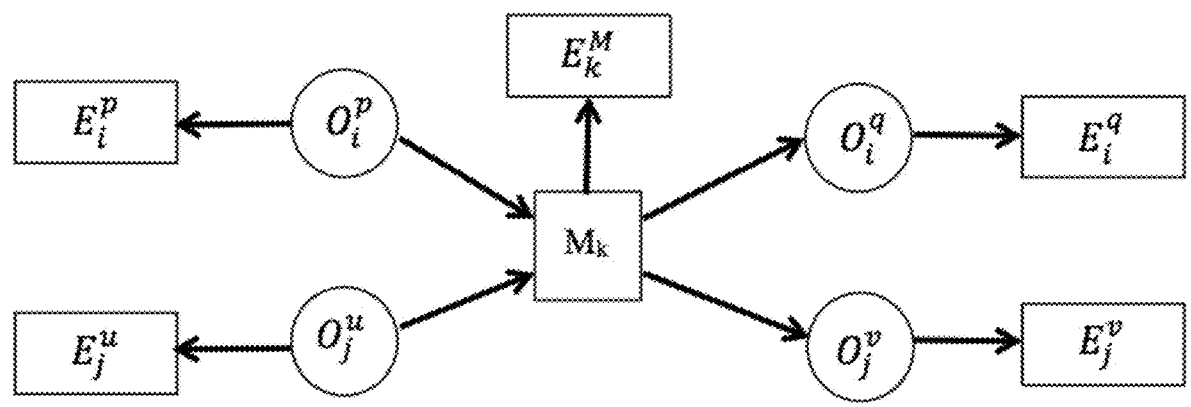
FIG. 1B is a graphical model illustrating paired objects manipulation.

The two models can alternatively be connected with a functional object motion. As illustrated in FIG. 1B, two objects i and j at their states $O_i^p$ and $O_j^u$ can change to their other states $O_i^q$ and $O_j^v$ through a manipulation reflected by a functional object motion $M_k$. All variables, states of the objects, and functional object motion could be hidden states with observations $E_i^p$, $E_j^u$, and $E_k^u$, as indicated in the figure. Pouring water from a teapot to a cup can be modeled with this model.

The above-described graphical model is a Bayesian network that is a powerful inference tool for decision making in the observation of several or many interrelated factors. The functional object motion $M_k$ is determined by the two interacting objects and their states ($O_i^p$ and $O_j^u$), and they are the parents of node $M_k$. Similarly, the new states ($O_i^q$ and $O_j^v$) are the consequence of the functional object motion, so it becomes the child of the motion $M_k$ in the graph. The remaining nodes are evidence from observations $E=\{E_i^p, E_j^u, E_k^M, E_i^q, E_j^v\}$, and they represent the evidence for $\{O_i^p, O_j^u, M_k, O_i^q, O_j^v\}$, respectively. Using the Bayesian rule and conditional independence relations, the joint probability distribution can be represented with Equation 1. After one obtains the evidence, the belief of each node can be estimated with loopy believe propagation algorithms.

$$P(O_i^p,O_j^u,M_k,O_i^q,O_j^v|e) \alpha P(O_i^p|E_i^p)P(O_j^u|E_j^u)P \\ (M_k|O_i^p,O_j^u)P(M_k|E_k^M)P(O_i^q,O_j^v|O_i^p,O_j^u,M_k)P \\ (O_i^q,O_j^v|e_{O_i^q},E_j^v), \quad (1)$$

Figure 3:
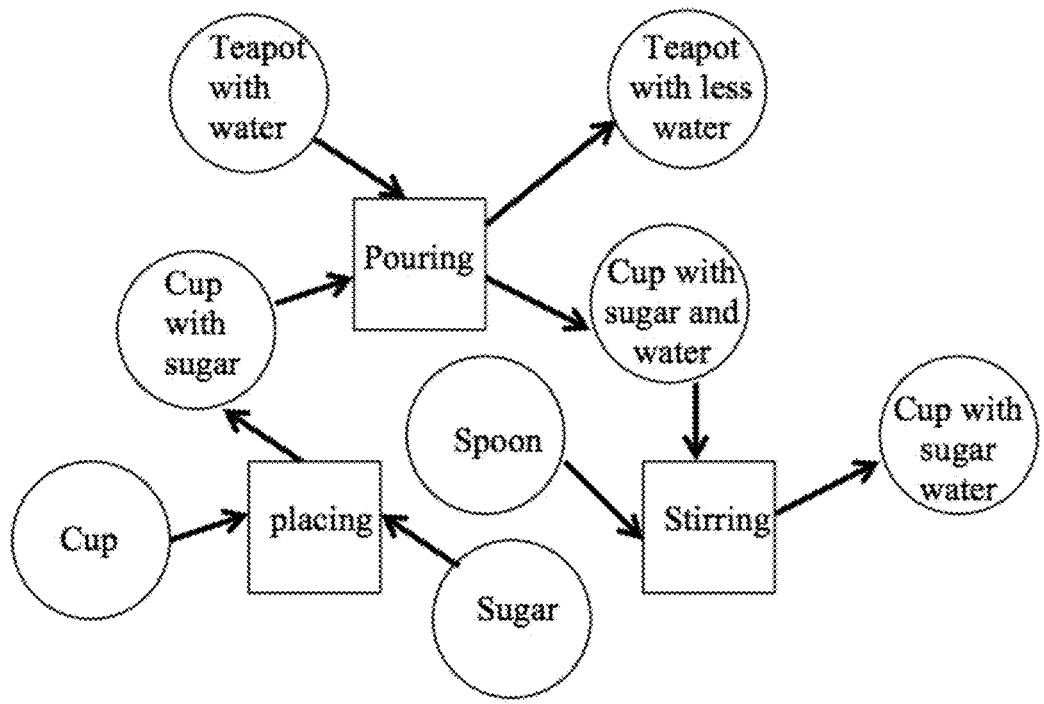
FIG. 3 is a graphical model of an example functional object-oriented network (FOON) built from observing a task of making a cup of sugar water.

With representations of the objects, their states, and the manipulation motions, a large FOON can be constructed. FIG. 3 graphically models an example FOON for a simple kitchen application. For clarity, the observation nodes have been omitted from the figure. Assume one has observed a process of making a cup of sugar water. With full labeling, the process can be expressed with the graphical model in FIG. 3. Sugar is placed in a cup with a placing motion, resulting a cup with sugar in it. Then, a teapot with water is held to pour water into the cup with a pouring motion, resulting in a cup with water and sugar in it, and an empty teapot. At the end, a spoon is put into the cup to stir the water to help the sugar dissolve with a stirring motion, resulting in a cup of sugar water. As can be appreciated from the two-object case discussed above, a FOON is structured from multiple Bayesian networks that are connected by a series of functional object motions that involve several objects at their different states. Clearly, the graphical model FOON can be learned and used as a Bayesian network.

Similar to a regular directed graph, a FOON contains nodes and edges. Therefore, a FOON F=(N, E) comprises a set N of nodes together with a set E of edges, where the edges have a direction associated with them. Different from a regular graph, the nodes in a FOON may have two types: object O or motion M. In a manipulation task, an object node $N_O$ represents an object that a manipulator is holding and manipulating or an object with which the manipulator interacts. For example, in a cooking task, a person cuts bread with a knife. In such a case, both the bread and the knife are objects and they can be represented as object nodes. More broadly, any ingredient, utensil or any item in general needed to accomplish a certain task could be an object node.

In addition to the object's name, each object has a set of attributes including an object state, which denotes the state or condition in which the object is observed, and an object descriptor, which describes whether the object is in motion or stationary in a given action. A motion node $N_M$ describes the action that is performed on an object. A motion has only one attribute that is a motion type descriptor.

In a FOON, no two object nodes are the same and each object node in the graph is unique in terms of its name and attributes. However, a motion node of the exact same type could appear at multiple locations in the graph.

A FOON is a directed graph because some nodes are the outcomes of certain other nodes. An edge, denoted by E, connects two nodes. Edges are drawn from either an object node to a motion node, or vice-versa, but no two objects or two motions are directly connected to each other. In addition, if several object nodes are connected with a motion node with edges directed to the motion node, it indicates that the objects are interacting with the motion. If a motion node has edges directed to object nodes, it indicates that the objects are the outcomes of the motion.

A FOON may be a directed semi-acyclic graph as there may be some instances of loops when an object does not change states from taking part in some action. A motion does not necessarily cause a change in an object, as certain objects will remain in the same state.

Figure 4:
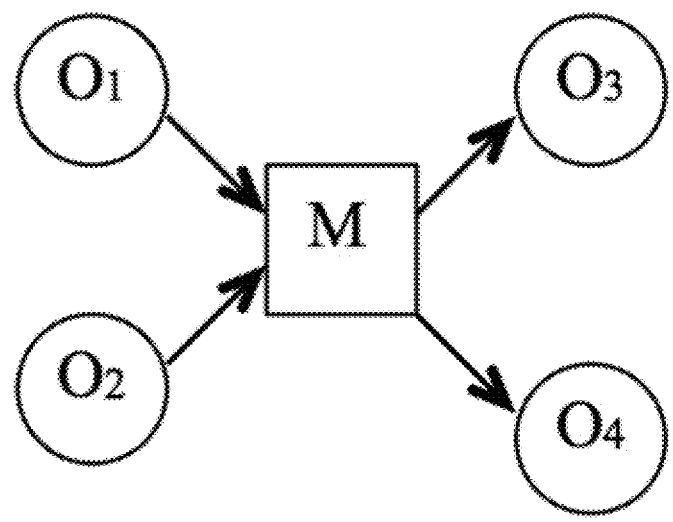
FIG. 4 is a graphical model of a functional unit that can form part of a FOON.

The minimum learning unit in a FOON is the functional unit. A functional unit represents the relationship between one or several objects and one functional motion associated to the objects, which will be learned to represent one activity. In the example functional unit shown in FIG. 4, the object nodes connected with the edges pointing to the functional motion node are called input object nodes, while the object nodes connected with the edges pointing from the functional motion node are called output object nodes. For example, referring back to the FOON of FIG. 3, the "pouring" motion node connecting the "teapot with water" input object node and the "cup with sugar" input object node, and the resulting "cup with water and sugar" output object node and "teapot with less water" output object node together form one functional unit in the FOON.

The network data structure of a FOON can be represented by conventional graph representations, namely adjacency matrices or adjacency lists. An adjacency matrix can be used to represent the network for its simplicity in representing a graph. Each node is represented by a row and its relation to other nodes is given by the columns of the matrix. An edge is denoted by a value of 1 for a given index; if two nodes are not connected, then an index has a value of 0. Accompanying the adjacency matrix is a node list which keeps track of all objects and/or motion nodes found in the graph. This list is needed to map each node to its row/column representation. In addition to the network structure, the object name and their attributes and motion types are saved and indexed with the node numbers in another file.

There are many different ways to observe the nodes for the purpose of constructing a FOON. For object states, a vision-based object recognition algorithm and geometry feature detection algorithm can be used to recognize objects and estimate their states. In some embodiments, a histogram of oriented gradient (HoG) features can be used to represent the objects and their states for recognition. In other embodiments, more advanced approaches can be used, if necessary.

Different from human motion recognition, the motion at issue focuses on the object motion or the relative object motion for dual objects, which represents the innate function of the objects. Functional principal component analysis (fPCA) can be used to extract dynamic features from the demonstrated motions and fPCA features can be used to represent and estimate the likelihood $P(M|E_M)$.

Instead of dealing with human motions, the innate functional motions of the objects, which is the product of the human motion, can be directly recorded, analyzed, and understood. Because humans have large degrees of freedom in the torso, arms, hands, and legs, humans can perform the same task and generate the same object motion with an unlimited number of possible motions. It is therefore more straightforward and simple to directly analyze the object motion.

To represent an object's functional motion, the motion can be segmented into smaller pieces based on the motion features. A trajectory-based motion segmentation approach can be used that first classifies interactive motions into ballistic or mass spring motion modes, and then uses the maximum velocity, average velocity, number of local minimum points, standard deviation, and motion distance to segment and characterize the interactive motion.

The popular Gaussian mixture model (GMM) treats motion samples as static points and loses the dynamic features of the motion, and then invents artificial dynamics when generating desired robot motions with Gaussian mixture regression (GMR). To preserve the dynamics in the motion and the object, a novel functional object motion classification approach based on fPCA can be used to recognize and analyze object motion segments and use the features to represent the motion state M in the graphical model in FIG. 1. The fPCA approach captures the principal modes of motion dynamics, which can further be used to learn manipulation motions from a human to program robotic arm motion by demonstration. The approach first aligns the motion segments with dynamic time warping (DTW) and then extracts orthogonal functional principal components (fPCs) with a B-spline function basis from observed motion segments without any discretization. Each motion segment can be represented by several principal scores of the major fPCs and a point in a relatively low-dimensional space. Motion segments with similar functions will cluster together in the low-dimension space and reveal patterns and differences compared to other type of motions with machine learning techniques.

Figure 5A:
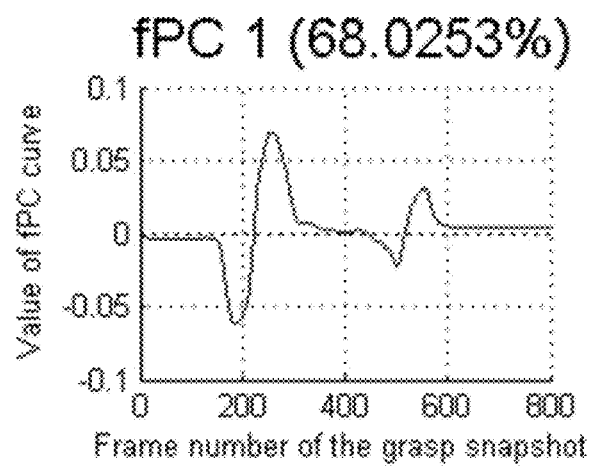
FIGS. 5A-5D are graphs that show (A) the most significant functional principal component (fPC) that represent the angle variation through a grasping procedure, (B) the second most significant fPC, (C) the original curve, and (D) the reconstructed curve using first two fPCs.
Figure 5B:
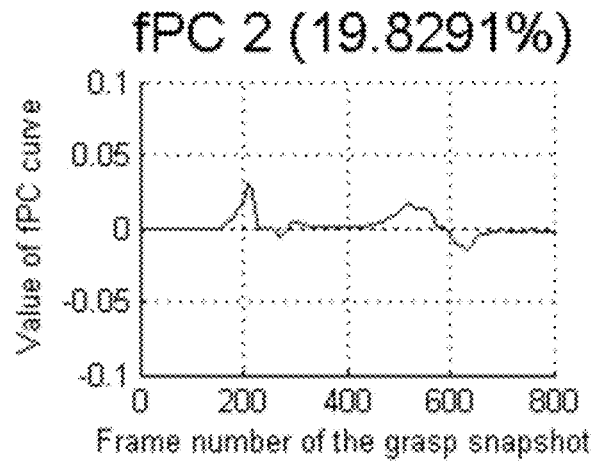
Figure 5C:
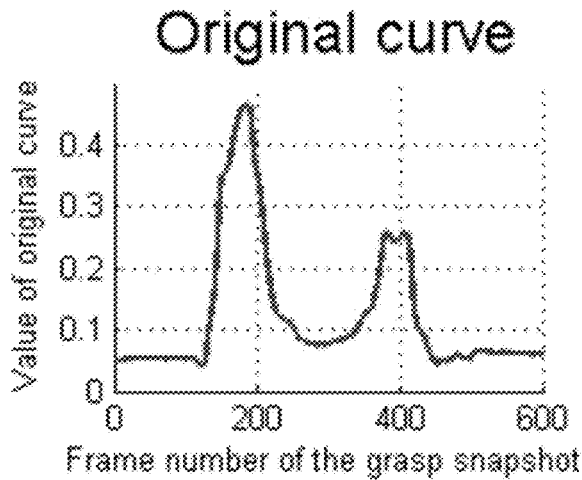
Figure 5D:
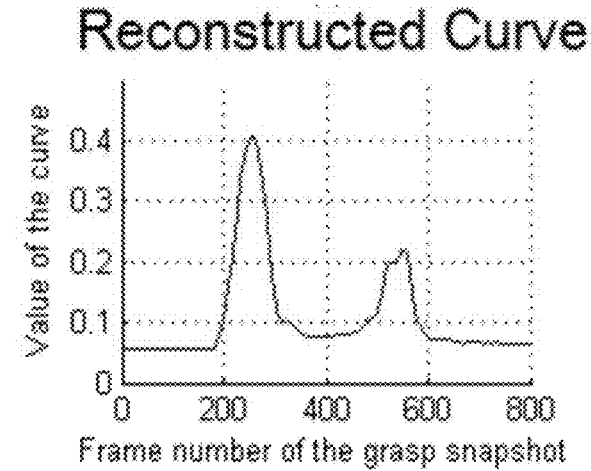

The fPCs of manipulation motion simply represent the principal curves that summarize the motion variation of the object. For example, FIG. 5 shows the original curve of a motion trajectory and its first two principal curves (fPCs), which dominate the variation during the grasping motion. FIGS. 5(c) and 5(d) show the original trajectory and the reconstructed trajectory using the two fPCs. It can be seen that the motion is reconstructed without losing much information.

With fPCA, a manipulation motion segment can be represented as a point in a low-dimensional fPC space, which can be used to represent and define a functional object motion state M in FIG. 1 with a feature-based classification approach, such as K-means clustering.

A FOON can be learned using a real environment or a virtual environment. As an example of a real environment, a kitchen environment can be created with multiple kitchen objects including kitchenware such as a tea kettle, a teapot and tray, a coffee pot, pots with lids, pans, two bowls, a pasta bowl, plates, glasses, and mugs; tools such as a chef's knife, a measure spoon, a corkscrew, a nutcracker, a tin opener, a fork, a serving spoon, a tea spoon, a cutting board, a mortar and pestle, and a dish rack; and raw materials and containers such as salt, pepper, coffee, tea, nuts, flour, sugar, vinegar, pasta, tomato, canned goods, and wine.

A sensor module can be attached to each of the objects and the raw material containers. By way of example, the sensor module can comprise a micro wireless nine degree-of-freedom (DOF) inertial measurement unit (IMU) sensor module with a unique digital ID that can, for example, contain a three-axis gyroscope, three-axis accelerometer, and three-axis magnetic field sensor, a microcontroller, a wireless module, and a battery cell. Such a sensor module can include, for example, MPU6050, HMC5883L, and MS5611 chips and the total active power consumption can be less than 7.5 mA with idle-mode power consumption less than 8 uA and operating at 3 to 5 V. Such a sensor module can have a very small footprint, with dimensions of, for example, approximately 17×11×10 mm. The module can communicate with a receiver with an ultra-low power 2.4 GHz radio frequency transceiver integrated circuit at maximum data rates of 2 Mbps. All DOF can be gyro-stabilized and transmitted at 70 Hz.

A strength of IMU modules is their continuous tracking ability that does not suffer from occlusion that occurs quite frequently during manipulation, either by the user or other objects. However, IMU modules may not be accurate over the long term due to accumulated error. Accordingly, the IMU sensors can be used in conjunction with a marker-based motion tracking system, such as NaturalPoint OptiTrack MoCap™, to achieve accuracy tracking without occlusion.

The objects and their states can be recognized and measured with a video surveillance system composed of six high-resolution cameras (Point Grey Flea3™) and three PrimeSense™ sensors mounted at several locations in the environment. The objects and their states can be hand-labeled. Later, HoG features can be used to represent and recognize objects and their states. RGB-D based object detection algorithms can also be applied to detect objects and their states.

Once the environment is set up, human operators can perform multiple tasks with the objects. In the case of a kitchen environment, these tasks can include cooking and serving tasks. The operators can have the freedom to perform any task they prefer. During this time, the movements of the objects can be tracked and the interactions between the objects can be stored.

As an example of a virtual environment, an online gaming system can be developed that is accessible to a much bigger population. By way of example, the game can be programmed in Unity Game Engineer™ and can support Phantom Omni™, Leap Motion Controller™, and the Wii™ controller. A richer daily living environment can then be built, which can include multiple rooms, such as a kitchen, a living room, a bathroom, and a bedroom. Daily living objects can be selected from the Google SketchUp Warehouse™ and placed in the virtual rooms. Tasks can be initially specified, which deal only with rigid objects. More tasks can be added, and deformable objects and interactions can be explored under the support of the Unity Game Engineer™ For training and computation, the FOON has excellent scalability, since the object states are only connecting through object motions and training can be carried out locally around the functional motions. Therefore, the approach does not suffer from the complexity of traditional network learning.

Once the fully trained graphical model FOON has been developed, a robot can be assigned a task. For example, in the kitchen environment, the robot can be tasked with making a cup of sugar water. In such a case, the robot can search the FOON and backtrack all the required objects that are required to complete the task. With reference back to FIG. 3, the robot will search and find the goal state "cup of sugar water" in the FOON. Then, using the FOON, the robot will know to look for a spoon, a cup with sugar, and water. If a cup containing sugar and water is not available, the robot can backtrack the FOON to determine what is needed to make one. The robot knows to look for a teapot with water and a cup with sugar. If a cup with sugar is not available, the robot knows from the FOON to look for a cup and sugar. After allocating all the required objects and the connoted manipulations, the robot can perform the task with the series of manipulations learned in the FOON to make a cup of sugar water.

The same concept can be expanded to the entire kitchen setup by using the learned FOON that connects each of the kitchen objects and their functional motions after the demonstration and learning procedures have been performed. After a task or a desired state of an object is defined, the same routing is performed to retrieve the involved objects, their desired states, and their types of functional motions. Then, the robot will seek the objects at their desired states and carry out a motion-generating algorithm to perform a manipulation motion to generate the desired functional object motions.

From the types of the functional object motions, their fPCA features can be recovered. A trajectory planning method can then be used to generate an optimal motion trajectory that is closest the learned fPCA features. The process can further satisfy task constraints, such as new start and end positions and velocities; the kinematic and dynamic constraints of the robot, such as the joint range, velocity, and acceleration ranges; and environment constraints, such as obstacle avoidance. More details on the trajectory-generating approach are described in "fPCA Based Human-Like Trajectory Generating," 2013, by Wei Dai, which is hereby incorporated by reference into the present disclosure.

A preliminary study was performed to evaluate the above described methodologies. The results have been published in the "Human-Object-Object Interaction Avoidance" paper referenced above. A dataset of six operators who performed six independent interactions on five pairs of objects was recorded. The data of four operators were used for training, and the data of the other two operators were used for testing. Each operator performed every manipulation in three trials. The interaction object pairs included teapot-cup, pencil-pencil case, bottle cap-bottle, CD-CD case, and spoon-cup. The actions for these object pairs were pouring water from a teapot into a cup, putting a pencil into a pencil case, screwing on a bottle cap, putting a CD into a CD case, and stirring a spoon in a cup. In addition to evaluating the performances of the objects and action recognition with the Bayesian network, the Bayesian network was used to generate manipulation features that drive the FANUC robotic arm and Barrett hand to perform the task with a visual servoing approach.

The object classifier, the action classifier, and the Bayesian Network were trained in a supervised manner. For the object classifier, the training images were collected from an ImageNet™ and Google Image™ search. For the action classifier and the Bayesian network, the training data was collected from manually-labeled video sequences. About 50 videos sequences that were performed by the four operators were used for training. For each training video sequence, object locations, reach locations, action type, and the start frame of the manipulation were labeled.

The test data set contained the action sequences performed by the remaining two operators. Compared with recognition approach using HoG detectors, the recognition rate of using the Bayesian network that contained both objects and manipulation motion improved from 73.5% to 84%. FIGS. 6A and 6B show the confusion matrices of the manipulated objects. From the confusion matrix, one can clearly see that the Bayesian network was able to separate the spoon from the pencil much more accurately using the interaction motion information and the appearance than just using appearance, since they have similar shapes.

The Bayesian network was also evaluated for motion recognition. FIG. 7A shows the likelihood confusion matrix estimated with only motion features. FIG. 7B shows the action confusion matrix using motion-object-object interaction Bayesian network. It can be seen that the overall average recognition rate across all manipulation motions improved from 42.6% to 83.0%. In the five studied manipulation motions, if based only on motion features, it was difficult to distinguish putting a CD into a CD case, putting a pencil into a pencil case, pouring water into a cup, and stirring water in a cup because they have the similar motion patterns. With the motion-object-object interaction Bayesian network, they could be distinguished.

Instead of programing the robot to perform a manipulating task manually, a visual servoing approach was designed that used the motion features in the affordance as the control goals. A Point Grey Flea™ video camera was used as the visual feedback, and a visual servo controller controlled the robot to perform the learned manipulation motions.

Figure 8A:
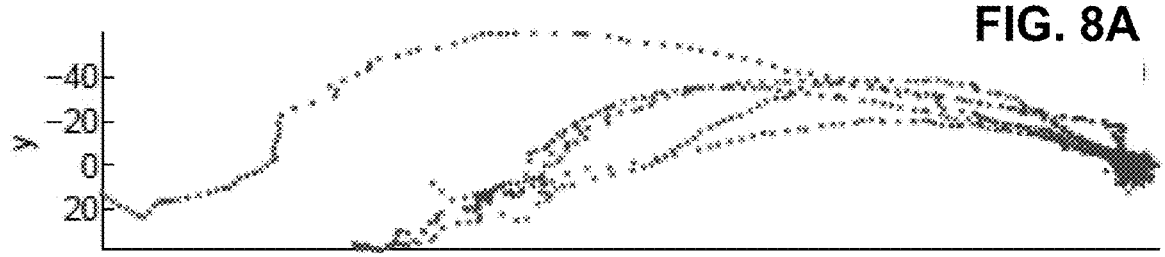
FIGS. 8A-8D are graphs that show (A) the training two-dimensional trajectories of the pouring motion associated to a teapot and a cup, (B) the Gaussian mixture model of the motion, (C) the desired motion the robot is used as its control input to perform the pouring with visual servoing, and (D) the desired teapot trajectory (dashed curve) versus the real teapot trajectory (solid curve).
Figure 8B:
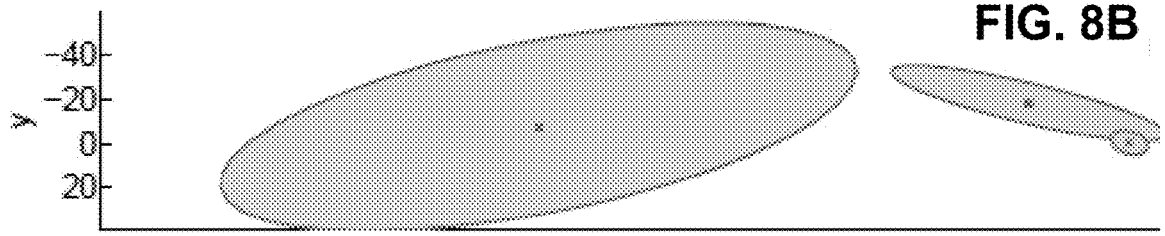

FIG. 8A shows the training two-dimensional trajectories of the teapot in reaching motion for its interaction with a cup (relative motion to the center of the cup). From the five trials observed, the key reach motion could be modeled with three Gaussian distributions, as shown in FIG. 8B. The models of the Gaussian distributions were trained to represent the interactive manipulation motion of the teapot when associated with the teapot-cup pair.

Figure 8C:
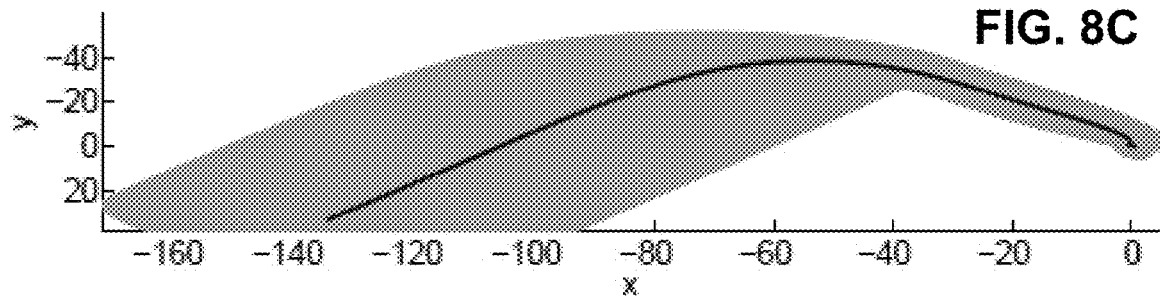
Figure 8D:
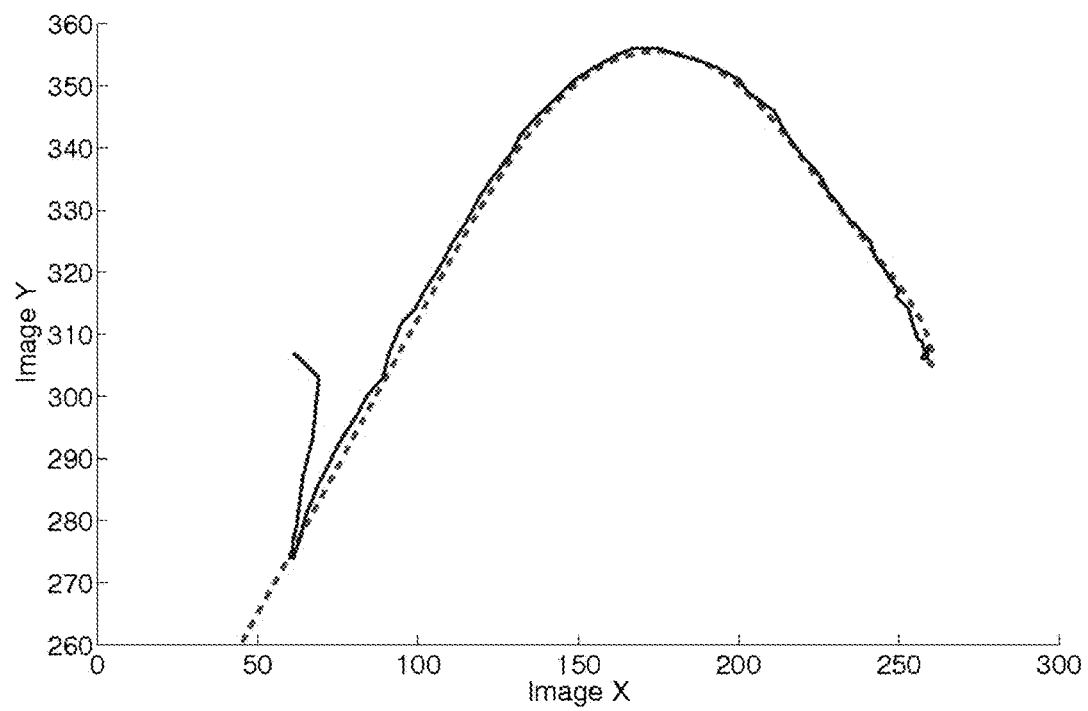

After the learning phase, when the robot observed a teapot and a cup, it looked up the stored manipulation models associated with the pair of objects and retrieved the affordance in interaction modeled with Gaussian distributions and then used the models to generate the desired manipulation it should perform with GMR. FIG. 8C shows the generated two-dimensional trajectory that was used for visual servoing input to control the robot to perform the desired manipulation. FIG. 8D shows one example of the robot's manipulation motion controlled by the visual servo controller, which follows the desired the trajectory generated by GMR accurately. The robot was able to follow all the learned desired motion with the visual servoing approach.

Ideally, a FOON would be automatically constructed from observing human activities, such as in the manner described above. Due to the complexity of such object recognition, state recognition, and motion recognition, human inputs can be used to construct multiple small FOON subgraphs based on instructional videos watched by the humans. The FOON subgraphs can then be automatically merged together into a universal FOON. Assuming a robot has already been taught the objects and motions identified in the FOON, the robot can later use the FOON as described above to complete a given task.

A simple annotating interface was developed for human operators to watch instructional videos and input their observations, one functional unit at a time. Using this interface, an operator can watch a motion being carried out, pause the video, and input the motion type, incoming and outcome object names, and their states in the interface. After a motion is annotated, its functional unit can be recorded and connected to the previous functional units to form a subgraph. The subgraph can then be saved into a file upon completion of the video. Each subgraph can have two files: a first file that contains labels for objects and motions and a second file that contains the graph representation.

The generated subgraph can then be visualized and verified in a simulation environment. Such a simulation environment can, for example, be made using the Unity Game Engineer™ software. Each edge can be color-coded to reflect the object-motion description assigned to an object node. For example, if the motion description is in-motion, the edge can be red. If the motion description is not in-motion, the edge can be green. Over 62 instructional videos were annotated using the above-described annotating interface.

Since many objects can appear in different FOON subgraphs, the objects can be combined to form a universal FOON. However, merging of subgraphs is not as straight forward as performing a union operation because the subgraphs are made separately and with different labels. Because of this, a parser was developed that is configured to preprocess all subgraph files to prepare them for the union operation. The parser has three main functions: creating a main index with a list of all the objects, recreating the input file by relabeling all of the objects so they are consistent throughout, and creating a records file that records all changes in any modified files. To keep track of all the data elements, there is a record classification that can contain the object name, its old identifier, its new identifier, initial state, final state, file name, and motion. When the program is first started, it populates new lists with stored information. The program then runs the input file through a while-loop. This loop recreates the input file with new object identifiers and it extracts all of the objects, object identifiers, object states, and object motions. The extracted information can then be placed into a record instance. The loop will terminate once the entire file is parsed. The new information will go through a series of for-loops and if-statements to eliminate any duplicates. When this is complete, the program rewrites the main index, state index, motion index, and record list with the new information.

After the nodes are made consistent within all the subgraphs, the union operation, performed by a union operator, can be run to merge all subgraphs, one at a time, into a universal FOON graph. The universal FOON graph starts from empty. The union operator first checks if objects in the subgraph already exist in the universal FOON graph and then checks if the edges are connected to the same motion nodes. If a node is completely new to the universal FOON, the node and its edges are added. Algorithm 1 below describes the merging procedure.

| Algorithm 1 Merging graph $G_{new}$ with FOON |
| --- |
| 1:    for all edges $E_i$ in $G_{new}$ do |
| 2:        let $E_i = \{ N_1, N_2 \}$ |
| 3:        if (!$N_1$ OR $N_2$ exists in FOON) then |
| 4:            Add node(s) to list G |
| 5:        end if |
| 6:        Create edge from note $N_1$ to $N_2$ in FOON |
| 7:    end for |

Figure 9:
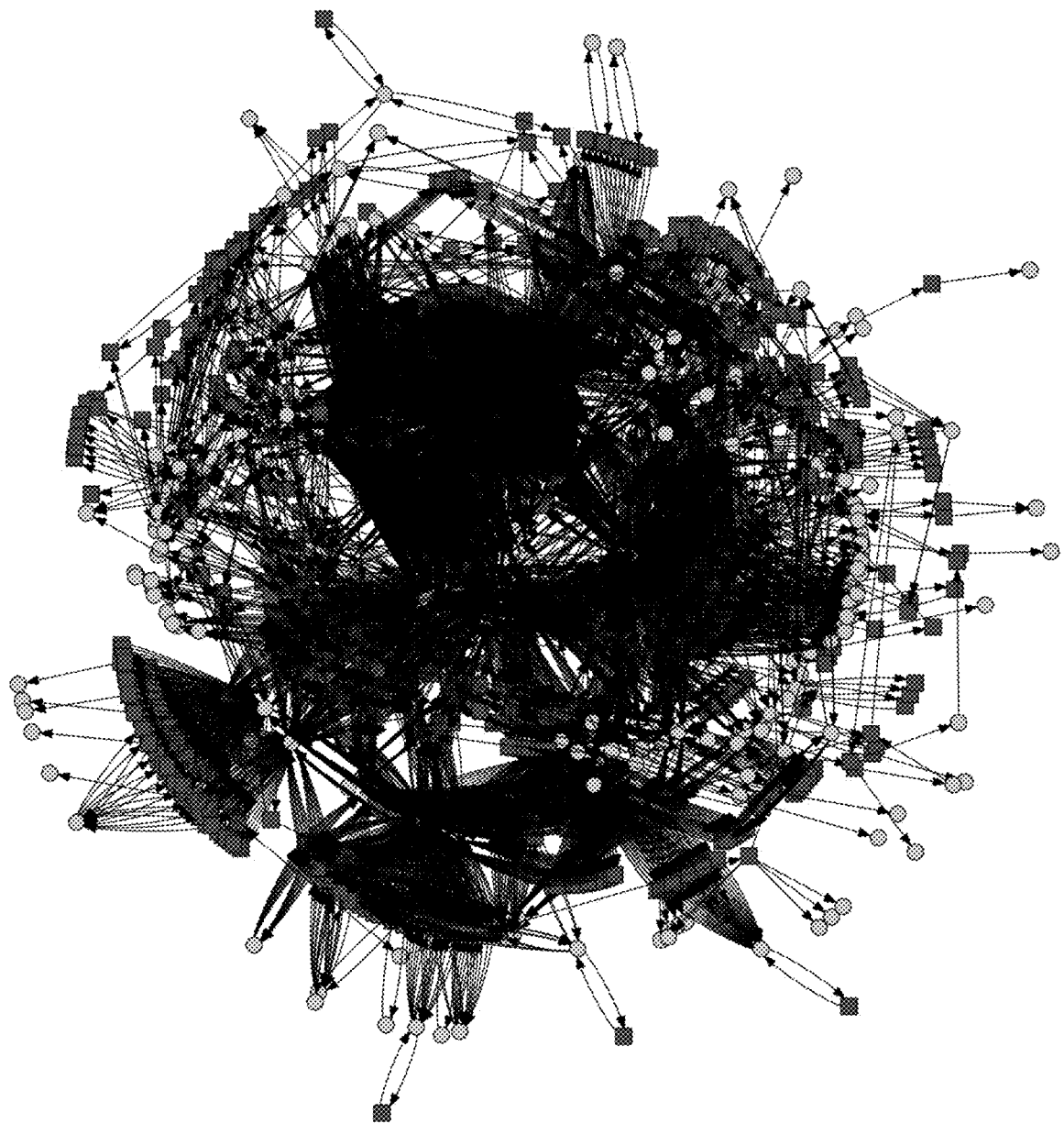
FIG. 9 is graphical model of a universal FOON that was constructed from 62 instructional videos.

A universal FOON can be expanded by merging new subgraphs when more annotations or learning are performed. Presently, the universal FOON created from the aforementioned 62 instructional videos has 1545 nodes and 3866 edges after merging 62 subgraphs. FIG. 9 graphically illustrates this FOON and reveals its density.

A universal FOON can be considered as a structured knowledge representation that can be used for various purposes. One such application is a robotics application. Considering the simple FOON example in FIG. 3, a robot can be assigned a task to make a cup of sugar water. As described above, the robot can do this using the FOON of that figure. In particular, the robot can search the FOON and backtrack all the required objects. First, the robot will search the FOON and find the goal state, which is represented by the "cup with sugar water" object node. Then, using the FOON, the robot will know to look for a spoon (from the "spoon" object node) and a cup with sugar and water (from the "cup with sugar and water" object node). If a cup with sugar and water is not available, the robot backtracks the FOON to determine what is needed to make one. By doing this, the robot knows to look for a teapot with water (from the "teapot with water" object node) and a cup with sugar (from the "cup with sugar" object node). In similar manner as before, if a cup with sugar is not available, the robot knows to look for a cup (from the "cup" object node) and sugar (from the "sugar" object node). After allocating all the required objects, the robot can perform the task with the series of manipulations learned in the FOON to make a cup of sugar water.

Given a desired goal and a set of available objects (such as ingredients and tools), formally, there are two steps in generating manipulations from the FOON: generating a task tree and generating a task sequence. In some embodiments, a combination of a depth-first search and a breadth-first search is used. The two steps are described in the following paragraphs.

First, a goal node $N_G$ in the FOON is identified based on the desired goal by searching the node list using a task tree algorithm. The initial task tree only contains the goal node, $T=(N_G,)$. Then for each iteration, the algorithm will check if the current node is an object node or a motion node. If it is an object node, the object is checked to see if it exists in the environment and is therefore available for manipulation. This check can be performed, for example, using a vision-based object recognition system. If the object exists in the observed environment, its child nodes will not be visited. If the object does not exist in the environment, however, the algorithm will continue to visit its child nodes using a depth-first search algorithm. The depth-first search algorithm is used because there could be multiple paths to produce that object and state.

If the current node is a motion mode, a breadth-first search algorithm is used and all the child nodes will be visited. The breadth-first search algorithm is used because all incoming object nodes need to be present to carry out the interactive motion. The algorithm stops when all current nodes are found in the environment. The visited nodes are stored as the task tree for the desired goal.

Figure 10:
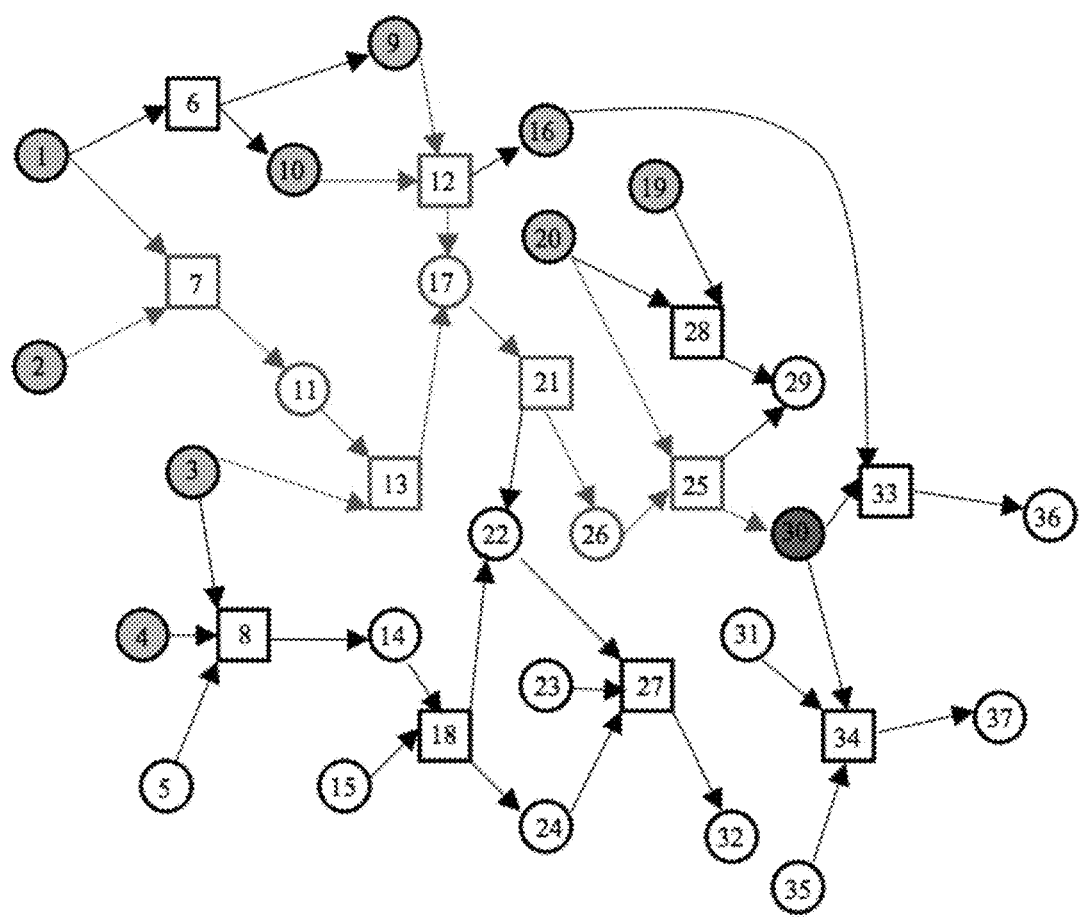
FIG. 10 is graphical model of an example FOON illustrating the building of a task tree.

An example result of running the task tree algorithm is illustrated in FIG. 10. In this figure, it is assumed object nodes 1-4, 9, 10, 16, 19, and 20 of the FOON subgraph identify available objects and the goal node is object node 30. Using the breadth-first search algorithm, object node 30's immediate child node, motion node 25, is added into the task tree (30, 25), and then node 25's two child nodes, object node 20 and object node 26, are visited and added. The tree then becomes (30, 25, 20, 26). Because object node 20 identifies an available object, there is no need to further explore node 20's child nodes. However, because the object node 26 identifies an unavailable object, its child node, motion node 21, and node 21's child node, object node 17, are added to the task tree. Object node 17 also identifies an unavailable object and has two child motion nodes, nodes 12 and 13. Switching to the depth-first search algorithm, motion node 12 is added to the tree, which then becomes (30, 25, 20, 26, 21, 17, 12). From motion node 12, the breadth-first search algorithm can be used and motion node 12's two child nodes, object nodes 9 and 10, can be added. Upon doing so, the task tree becomes (30, 25, 20, 26, 21, 17, 12, 9, 10). Because each of the nodes of this task tree is or can be made available, the algorithm stops. Therefore, Task Tree 1 is (30, 25, 20, 26, 21, 17, 12, 9, 10).

Alternatively, if the algorithm is modified and enabled to explore object node 17's second child node, motion node 13, a slightly different task tree results. From motion node 13, the breadth-first search algorithm is used and adds motion node 13's two child nodes, object nodes 3 and 11, resulting in a tree of (30, 25, 20, 26, 21, 17, 13, 3, 11). Because object node 3 identifies an available object, only object node 11's child nodes, motion node 7 must be visited. Upon doing so, object nodes 1 and 2 are visited and added. So, a Task Tree 2 results and is (30, 25, 20, 26, 21, 17, 13, 3, 11, 7, 1, 2).

Because there are 3 motion nodes in the Task Tree 1, it would take 3 functional units to achieve the desired goal. Because there are 4 motion nodes in Task Tree 2, it would take 4 functional units to achieve the same goal. Therefore, if all functional units have the same cost, Task Tree 1 is more efficient than Task Tree 2.

For object nodes with more than two child nodes, a branch-and-bound algorithm can be used that keeps track of the depth of the tree as its cost. Once a successful task tree is achieved, the cost is considered the initial best cost. At each step of the depth-first search, the algorithm compares the current cost to the best cost and, if it exceeds the best cost, the algorithm stops the search of that branch. If a less costly task tree is found, however, the algorithm updates the best cost.

Once the task tree has been generated, it can then be used to generate a task sequence that contains a series of motions, objects, and their states, which provides step-by-step commands for a robot to execute. For example, if Task Tree 1 is stored in a stack, nodes 10, 9, 12, and 17 are identified as one functional unit. The robot is instructed to operate on objects 9 and 10 with motion 12 to produce object 17. Once object 17 is produced, motion 21 is identified with the next goal node 26 to instruct the robot to operate on object 17 to produce object 26. When object 26 is produced, object node 20, motion node 25, and goal node 30 are identified and the robot is instructed to operate on object 20 and 26 with motion 25 to produce object 30 that is the final desired object.

Figure 11:
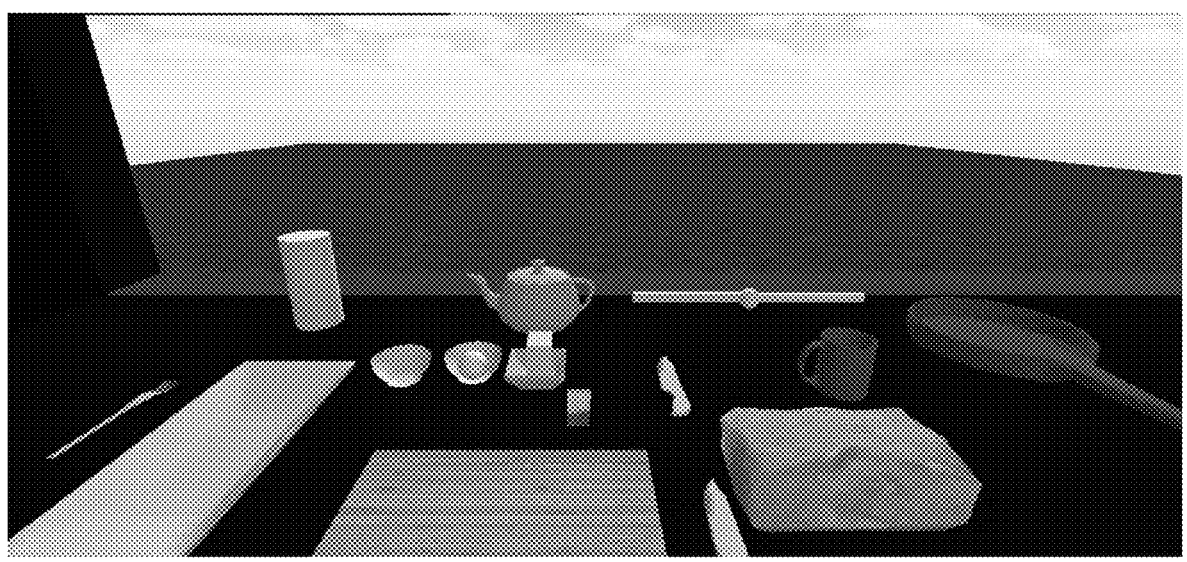
FIG. 11 is a rendering of a simulated kitchen environment that was used to demonstrate generated task sequences.

A simulated kitchen environment illustrated in FIG. 11 was developed using Unity Game Engineer™ to demonstrate the usage of task sequences. The simulation comprised many common kitchen objects within a three-dimensional space that can be moved based on input. A task sequence contained data from a FOON in the form of a graph node, where each node contained a label for a motion, labels for objects and their states, and an indicator for whether or not the object is in motion. The objects in the simulation were linked to the object's labels in the FOON, while predefined motion functions were associated to the motion labels.

Figure 12:
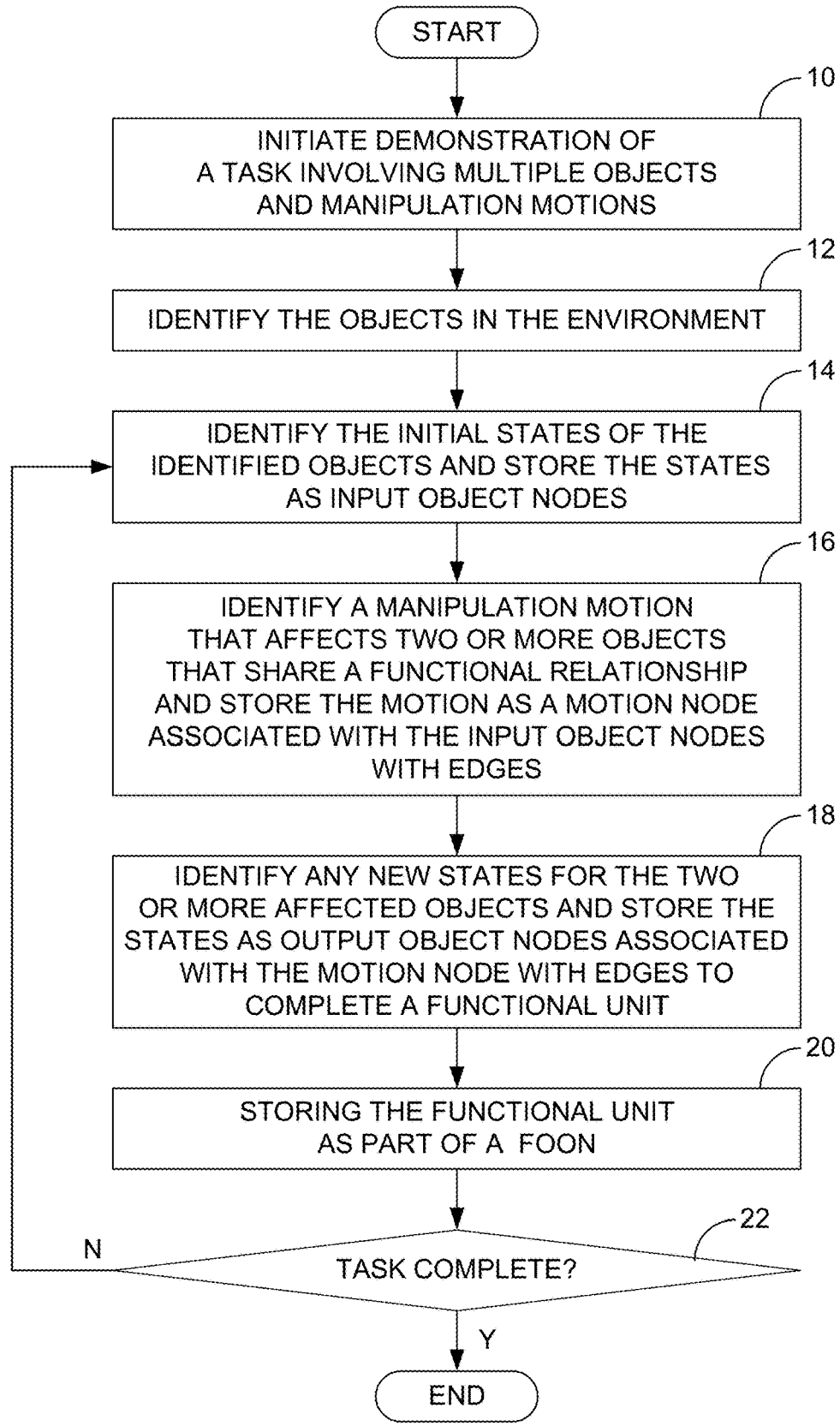
FIG. 12 is a flow diagram of an embodiment of a method for constructing a FOON.

FIG. 12 is a flow diagram that illustrates an example method for constructing a FOON that is consistent with the foregoing disclosure. It can be appreciated from that disclosure that a FOON can be automatically constructed using a computer-based device, such as a standalone computer or robot. In such embodiments, the computer-based device can track tasks performed by a human being (either live or recorded) or performed within a virtual environment. The computer-based device can recognize the objects in the environment and track each object's motion using sensors attached to the objects and/or a computer vision system. The computer-based device can then automatically construct portions of the FOON based upon the tracked motions. It can also be appreciated from the foregoing disclosure that a FOON can be manually constructed by a human operator. In such embodiments, the operator can observe tasks performed by a human being (either live or recorded) or performed within a virtual environment. As described above, the human operator can manually input annotations into a user interface that can be used to form portions of a FOON. In view of this, the various steps of the flow diagram of FIG. 12 can either be performed by a computer-based device (e.g., robot), a human operator, or a combination thereof.

With reference to block 10 of FIG. 12, a demonstration of a task involving multiple objects and manipulation motions can be initiated. As noted above, the demonstration can be live or recorded, or can comprise a virtual demonstration. Referring to block 12, the various objects within the environment can be identified, as indicated in block 12. In keeping with the example of FIG. 3 described above, in which the task was making a cup of sugar water, these objects can comprise sugar, a cup, a teapot, and a spoon. Next, with reference to block 14, the initial states of the objects are identified and stored as input object nodes. Example input nodes "sugar," "cup," "teapot with water," and "spoon" are shown in FIG. 3.

Referring next to block 16, a manipulation motion that affects two or more objects that share a functional relationship is identified and the motion is stored as a motion node associated with the input object nodes with edges. Returning to the example of FIG. 3, two objects that share a functional relationship in the task of making a cup of sugar water are the sugar and the cup and the manipulation motion that affects them is placing sugar in the cup. Accordingly, a motion node "placing" is stored and associated with the "sugar" and "cup" input nodes with edges as shown in FIG. 3.

Next, with reference to block 18, any new states of the affected objects are identified and stored as output object nodes associated with the motion node with edges to complete a functional unit. Returning again to the example of FIG. 3, a new state of the cup having sugar in it that resulted from the placing can be identified. Accordingly, the output object node "cup with sugar" is shown in FIG. 3. In this example, the input object nodes "sugar" and "cup," the motion node "placing," and the output object node "cup with sugar" together form one functional unit. This functional unit can be stored as part of a FOON, as indicated in block 20.

At this point, flow depends upon whether or not the task is complete, as indicated in decision block 22. In keeping with the example of FIG. 3, assuming that so far only a cup having sugar in it has been achieved, the task of making a cup of sugar water is not complete. In such a case, flow returns to block 14 so the next functional unit of the task can be added to the FOON. In such a case, the "initial" states of the objects are the states of the objects after the previous action (placing sugar in a cup). With reference to the example of FIG. 3, the next functional unit would comprise the input object nodes "cup with sugar" and "teapot with water," the motion node "pouring," and the output object nodes "teapot with less water" and "cup with sugar and water. As can be appreciated from the flow diagram and the above discussion, flow continues until each functional unit of the task has been added to the FOON. At that point, the FOON is ready for use in performing the task.

Figure 13:
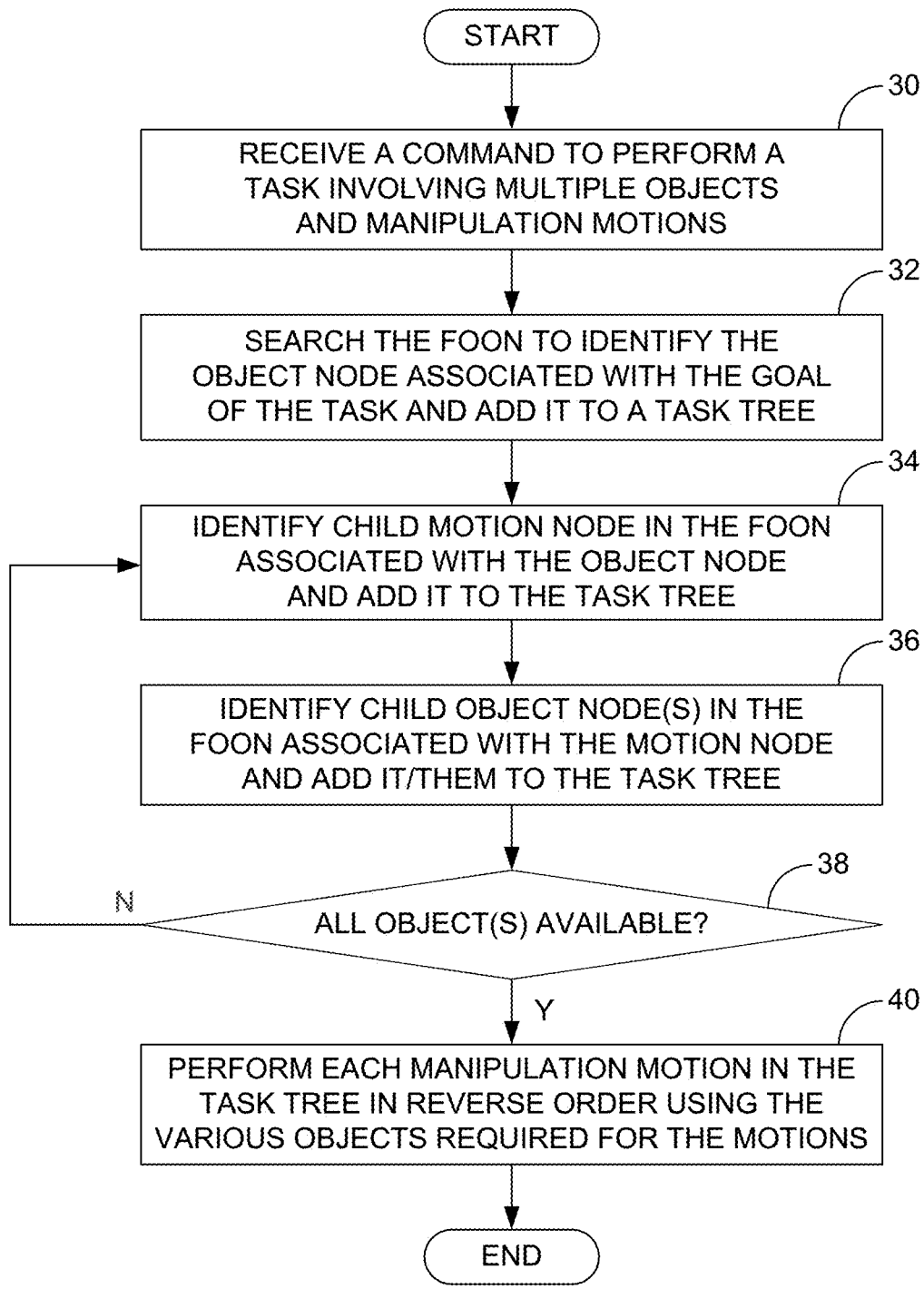
FIG. 13 is a flow diagram of an embodiment of a method of using a FOON to complete a commanded task.

A FOON such as that constructed using the method of FIG. 12 can be used by a computer-based device, such as a robot, to perform tasks that are stored within the FOON. FIG. 13 provides an example of this. Beginning with block 30 of FIG. 13, a command is received to perform a given task involving multiple objects and manipulation motions.

Assuming the FOON includes the task, the robot can search the FOON for the object node associated with the goal of the task and add it to a task tree, as indicated in block 32. With reference to the example FOON of FIG. 10, it can be assumed that object node 30 is the goal object node.

Referring next to block 34, the child motion node associated with the goal object node is identified and added to the task tree. In the example of FIG. 10, this node is motion node 25. Next, as indicated in block 36, the one or more child object nodes associated with the motion node is/are identified and added to the task tree. In the example of FIG. 10, this includes object nodes 20 and 26.

Flow from this point depends upon whether or not each of the child objects associated with the motion node are available or not, as indicated in decision block 38. For example, if the object identified in an object node is a spoon that was to be used to stir a liquid, the spoon is available if it is within the environment. If the object were a cup with sugar in it, however, the object would not be "available" if it has not yet been prepared. For instance, if there is sugar and an empty cup in the environment, a different motion would be required to use those objects to achieve the state of a cup with sugar in it.

In the example of FIG. 10, the object identified in object node 26 is not available. Assuming that not all of the objects are available, flow returns to block 34 and the child motion node associated with the object node is identified and added to the task tree. In the example of FIG. 10, this is motion node 21. Referring again to block 36, the one or more child object nodes associated with the motion node is/are identified and added to the task tree. In the example of FIG. 10, this includes object node 17. Because the object associated with object node 17 is not available, flow again returns to blocks 34 and 36 and motion node 12 and object nodes 9 and 10 are added to the task tree. This time, because the objects associated with object nodes 9 and 10 are present, the task tree is completed. Therefore, flow can continue from decision block 38 to block 40 at which each manipulation motion of the task tree can be performed in reverse order using the various required objects.

Figure 14:
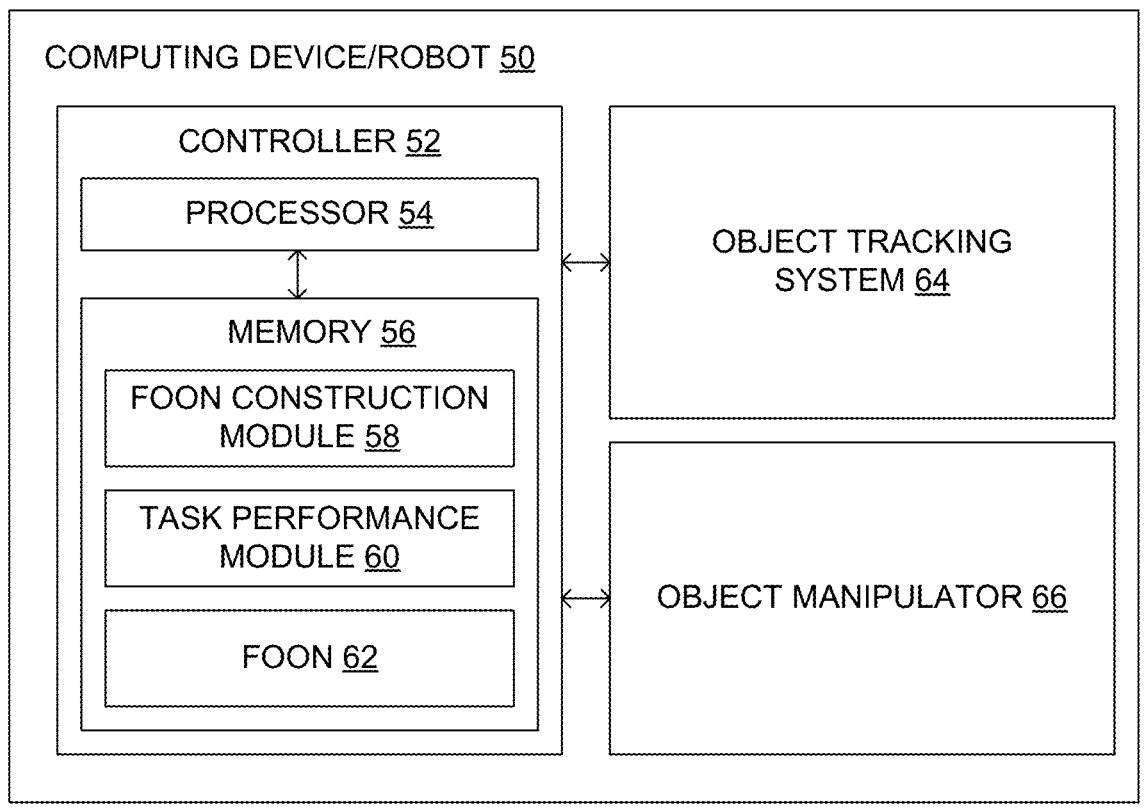
FIG. 14 is a block diagram of a computing device/robot that constructs and/or uses a FOON.

FIG. 14 shows a block diagram of a computer-based device 50, which can comprise a computer or a robot, that can construct a FOON and/or use a FOON to perform a commanded task. As shown in FIG. 14, the device 50 includes a controller 52 that is used to control operation of the device and its various components. In the example of FIG. 14, the controller 52 comprises a processor 54 and memory 56 that stores various programs or algorithms. These programs/algorithms include a FOON construction module 58 that can be used to construct a FOON, for example, in the manner described above in relation to FIG. 12, and a task performance module 60 that can be used to perform a commanded task using a FOON, for example, in the manner described above in relation to FIG. 13. In addition, the memory 56 stores a FOON 62, which can have been constructed using the FOON construction module 58.

With further reference to block 64, the computer-based device 50 also includes an object tracking system 64, which can utilize object sensors and/or computer vision systems, and an object manipulator 66, which can comprise a mechanism that can be used to grasp and move objects in a manner necessary to perform a commanded task.

In the above disclosure, it was assumed that a FOON is created either by a computer-based device or a human operator watching a demonstration of a task. It is noted, however, that, in other embodiments, a FOON can be created in other ways. For example, a FOON can be created with reference to an instruction manual, such as a cookbook. In some embodiments, a FOON can be manually constructed by a human operator reading a recipe and providing annotations similar to those described above in relation to the instructional video example. For each step of the task, the operator can extract the input objects with states, the motion, and outcome objects with states, and then input them as a functional unit using the same or similar interface as that described above. Then, a FOON subgraph can be generated using appropriate software.

In other embodiments, an automatic approach can be used. In such a case, a parser can be used to find verbs, nouns, and adjectives in the recipes. For each step in the recipe, a verb can be used to determine the motion, nouns can be used to determine the input objects, adjectives can be used to determine the objects' states, other nouns can be used to determine the output objects, and other adjectives can be used to determine the output objects' states. The separation between the input nouns are output nouns can be made by using keywords such as "until."

The invention claimed is:

1. A method for performing a task using a functional object-oriented network, the method comprising:
   a robot receiving a command to perform a task;
   the robot searching a functional object-oriented network to identify an object node associated with a goal of the task and adding the object node to a task tree;
   the robot identifying a child motion node in the functional object-oriented network associated with the object node and adding the motion node to the task tree;
   the robot identifying one or more child object nodes in the functional object-oriented network associated with the motion node and adding the child object nodes to the task tree; and
   the robot determining if objects associated with the child object nodes are available.

2. The method of claim 1, wherein if the robot determines the objects associated with the child object nodes are available, performing a motion associated with the motion node using the child object nodes to perform the task.

3. The method of claim 2, wherein performing a motion comprises actuating a manipulator to grasp and move at least one of the objects associated with the child object nodes.

4. The method of claim 1, wherein if the robot determines the object associated with one or more of the child object nodes are unavailable, the robot identifying a child motion node in the functional object-oriented network associated with the child object nodes and adding the motion node to the task tree, and the robot identifying one or more child object nodes in the functional object-oriented network associated with that motion node and adding the child object nodes to the task tree.

5. The method of claim 4, further comprising the robot continually identifying a child motion node in the functional object-oriented network associated with the child object nodes and adding the motion node to the task tree, and identifying one or more child object nodes in the functional object-oriented network associated with that motion node and adding the child object nodes to the task tree until there are no child object nodes that are unavailable.

6. A non-transitory computer-readable medium comprised by a robot, the computer-readable medium comprising:
   a functional object-oriented network stored on the computer-readable medium that is configured to be accessed by the robot after the robot receives a command to perform a task, the network comprising a plurality of functional units that are connected to each other within the network, each functional unit comprising two or more object nodes that each identify an object and its state before a manipulation motion is performed by the robot, wherein the network is configured to be searched by the robot to identify an object node associated with a goal of the task, a child motion node that identifies a manipulation motion that can be performed using the objects, wherein the network is further configured to be searched by the robot to identify a child motion node associated with the identified object node, and one or more child object nodes that each identify an object and its state after the manipulation motion has been performed using the objects, wherein the network is still further configured to be searched by the robot to identify object nodes associated with the identified child object node.

7. The computer-readable medium of claim 6, wherein the object nodes are connected to the child motion nodes with edges and the child object nodes are connected to the child motion nodes with further edges.

8. The computer-readable medium of claim 6, wherein the object nodes of some functional units are child object nodes of other functional units.

9. A robot configured to perform tasks, the robot comprising:
   a processor;
   a manipulator; and
   memory that stores a functional object-oriented network comprising a plurality of functional units that are connected to each other within the network, each functional unit comprising two or more object nodes that each identify an object and its state before a manipulation motion is performed, a child motion node that identifies a manipulation motion that can be performed using the objects, and one or more child object nodes identifying that each identify an object and its state after the manipulation motion has been performed using the objects, wherein the functional units identify to the robot the discrete actions required to perform a given task;
   wherein the robot is configured to receive a command to perform a task, search the functional object-oriented network to identify an object node associated with a goal of the task and add the object node to a task tree, identify a child motion node in the functional object-oriented network associated with the object node and add the motion node to the task tree, identify one or more child object nodes in the functional object-oriented network associated with the motion node and add the child object nodes to the task tree, and determine if objects associated with the child object nodes are available.

10. The robot of claim 9, further comprising an object tracking system.

* * * * *